United States Patent [19]

Mairlot

[11] Patent Number: 4,848,048
[45] Date of Patent: Jul. 18, 1989

[54] CURVED GLAZED ROOFS

[75] Inventor: Henri Mairlot, Acoz, Belgium

[73] Assignee: Glaceries de Saint-Roch S.A., Sambreville, Belgium

[21] Appl. No.: 160,319

[22] Filed: Feb. 25, 1988

[30] Foreign Application Priority Data

Feb. 27, 1987 [BE] Belgium ............................... 8700185

[51] Int. Cl.⁴ .............................................. E04B 7/14
[52] U.S. Cl. ............................................. 52/86; 52/222
[58] Field of Search ...................................... 52/222, 86

[56] References Cited

U.S. PATENT DOCUMENTS

| | | | |
|---|---|---|---|
| 2,427,021 | 9/1947 | Rapp | 52/222 |
| 2,988,810 | 6/1961 | Wilken | 52/222 |
| 3,057,119 | 10/1962 | Kessler | 52/222 |
| 3,763,618 | 10/1973 | Bennett | 52/222 |
| 4,055,030 | 10/1977 | Earnshaw | 52/222 |
| 4,221,100 | 9/1980 | Lindblad | 52/86 |
| 4,358,183 | 11/1982 | Whiteford | 52/222 |
| 4,536,997 | 8/1985 | Heescher | 52/222 |
| 4,723,386 | 2/1988 | Sandow | 52/86 |

Primary Examiner—Henry E. Raduazo
Attorney, Agent, or Firm—Leonard Bloom

[57] ABSTRACT

A curved glazed roof for use particularly as a greenhouse, and a method for the production thereof. This roof has at least one continuous vault including at least two successive glazed spans, each span having at least two juxtaposed curved glazed panels. The panels include a sheet of thermally-tempered, cold-curved glass having a resiliently-flexed curvature formed therein. This resiliently-flexed curvature is maintained under constraint by a frame which is secured to the sheet of glass. Each of the frames in each span are secured to the fame of another panel, positioned juxtaposed thereto, forming a span. At least one of the frames of one of the panels in one of the spans is secured to at least one of the frames of one of the panels in another, adjacent span, forming successive spans which make up the vault. A framework of trusses, longitudinal beams, struts and peak beams is disclosed for the various roofs. The roofs may either be fixed in place or a span, spans or a portion of any number of spans may be movable, to be opened in order to provide ventilation to the structure. A greenhouse and a framework therefore which may be utilized with the curved glazed roof is also disclosed.

37 Claims, 11 Drawing Sheets

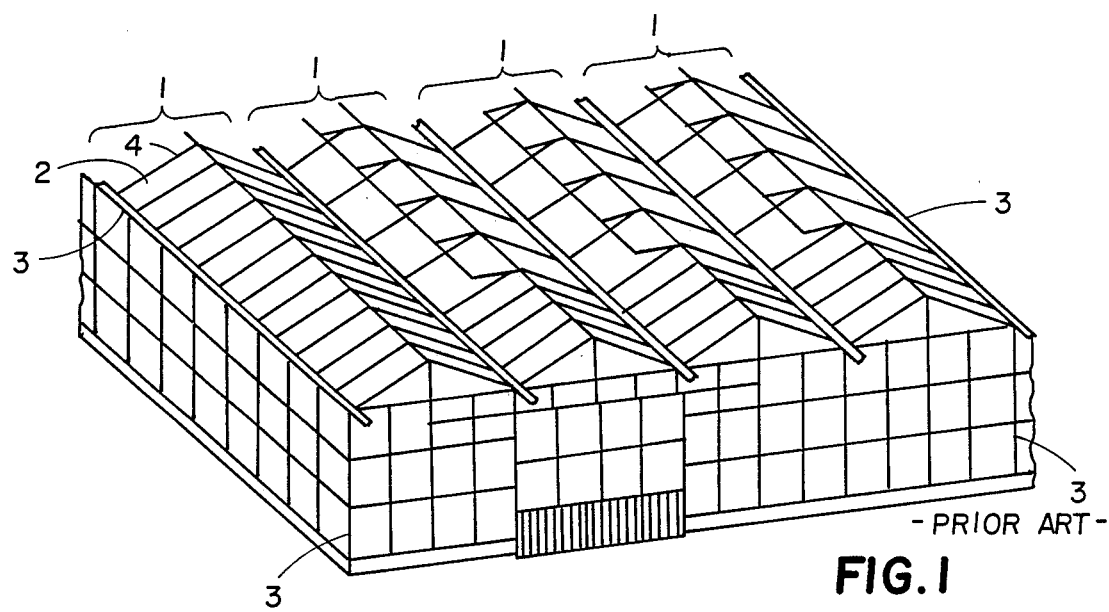
FIG. 1 -PRIOR ART-
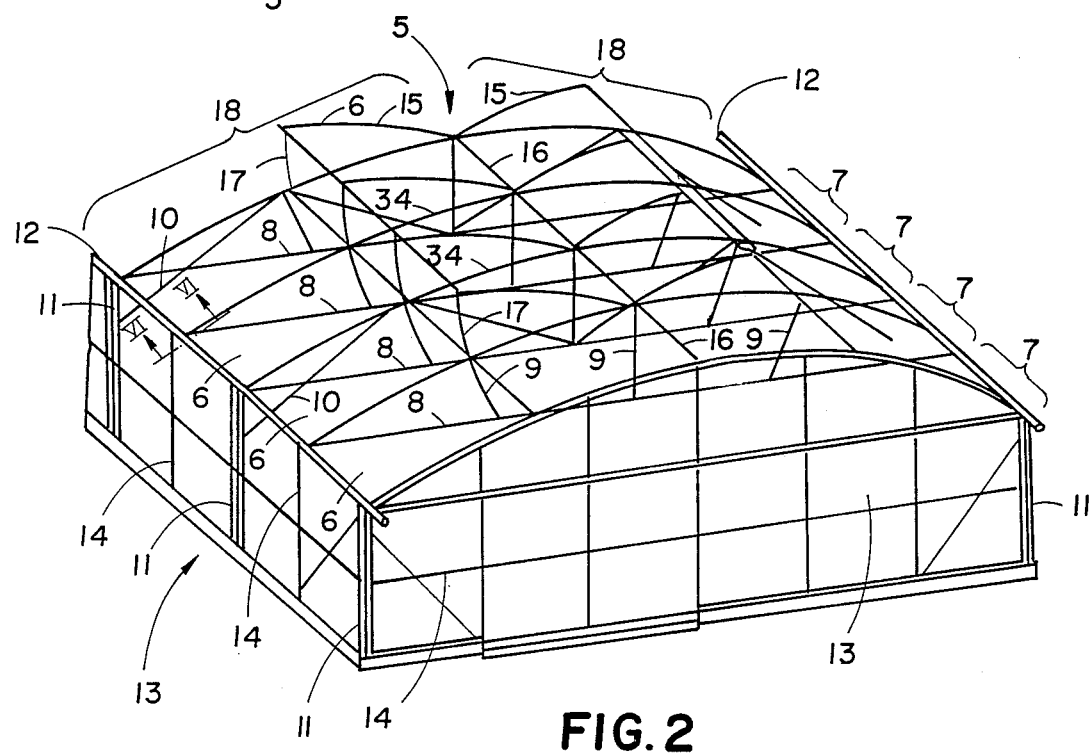
FIG. 2

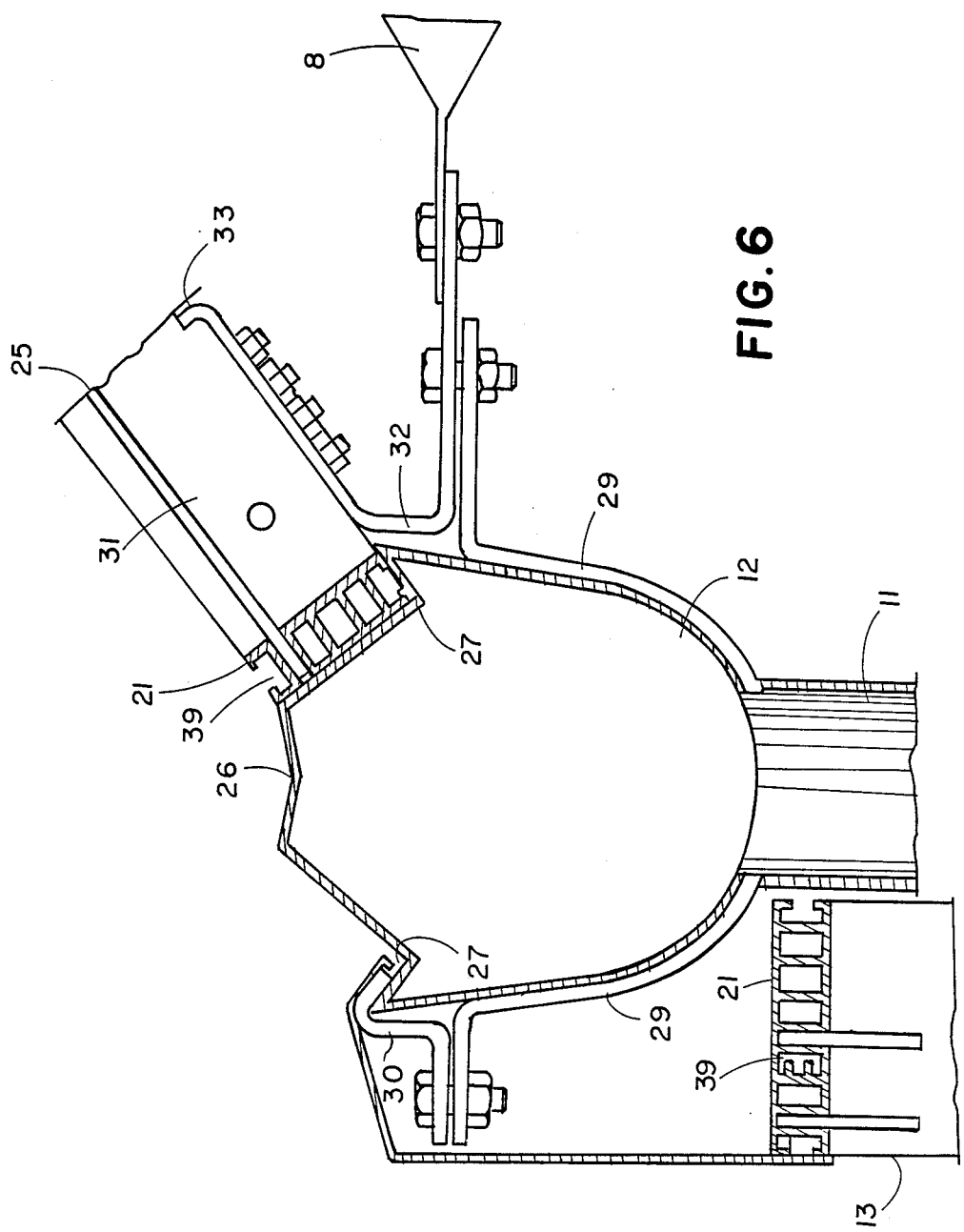

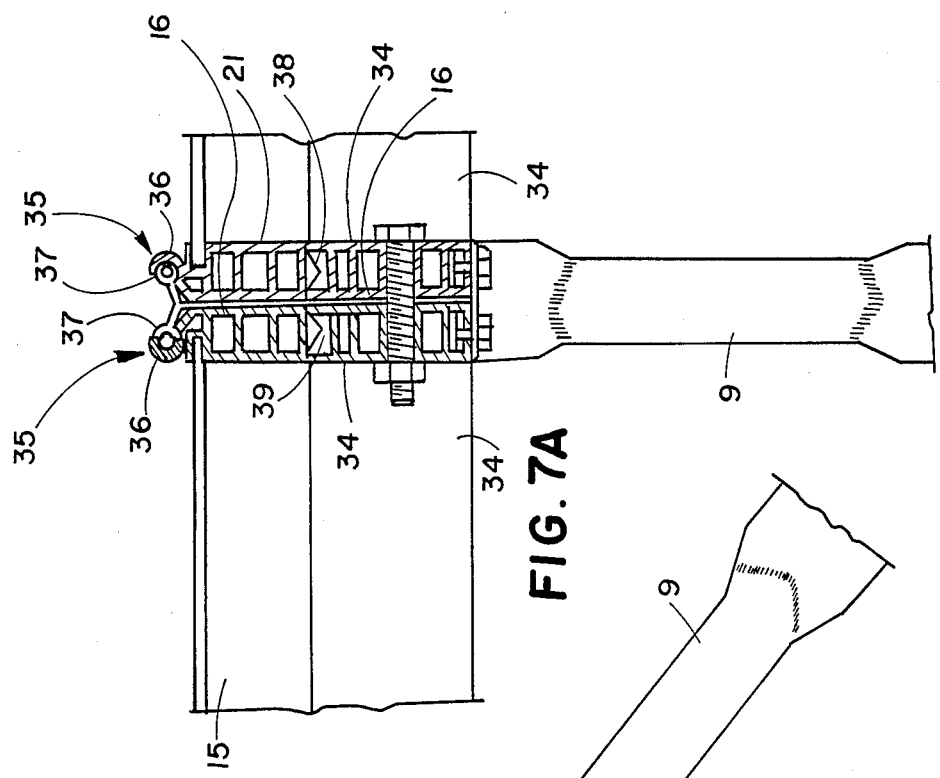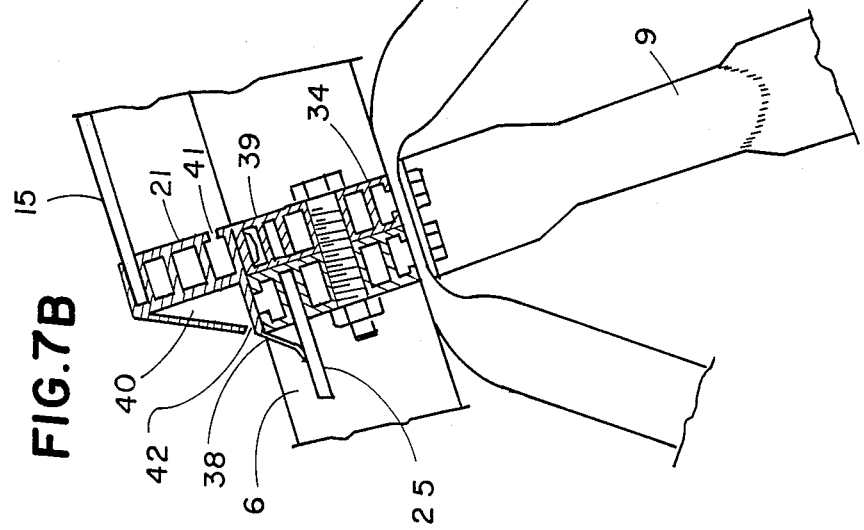

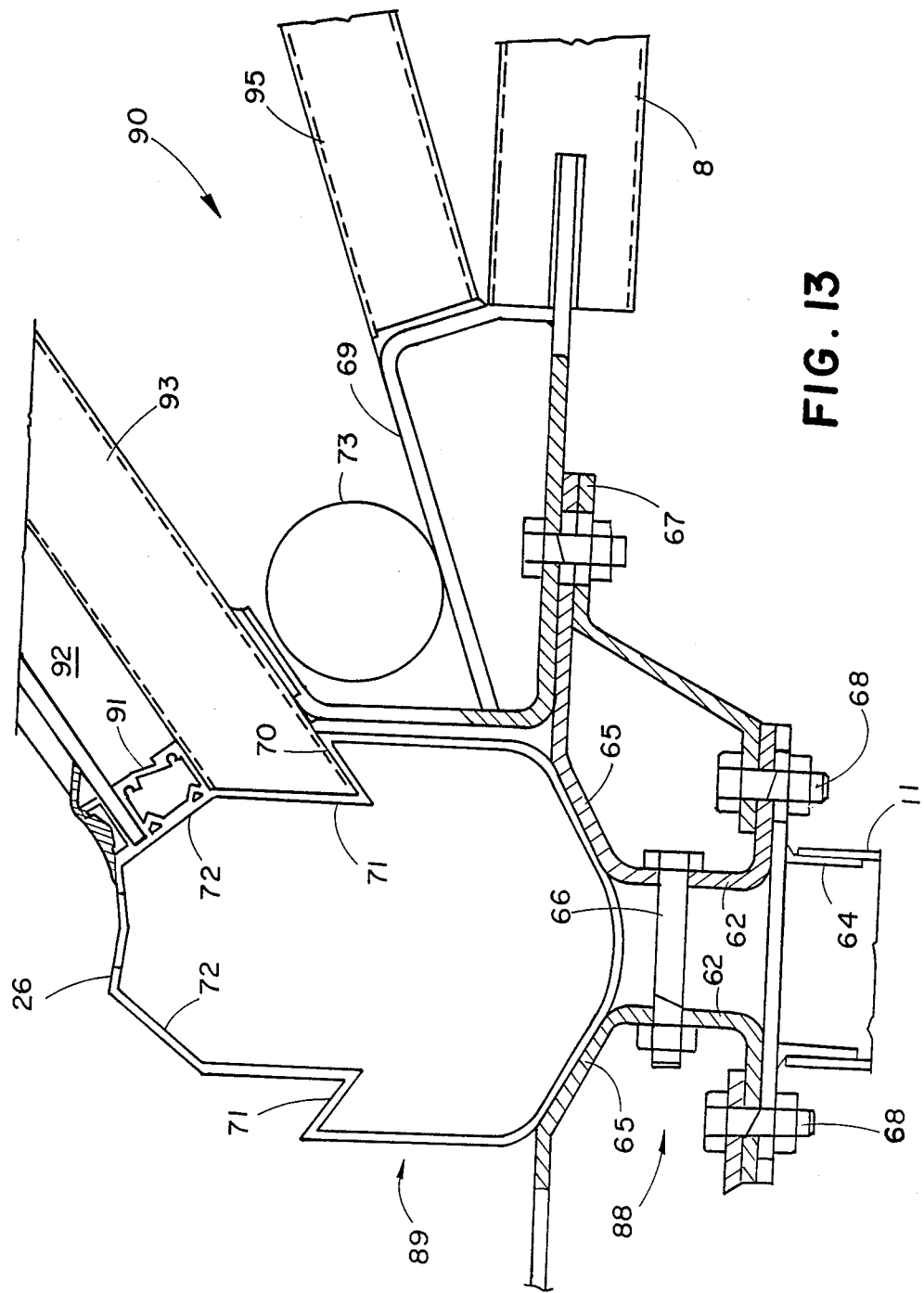

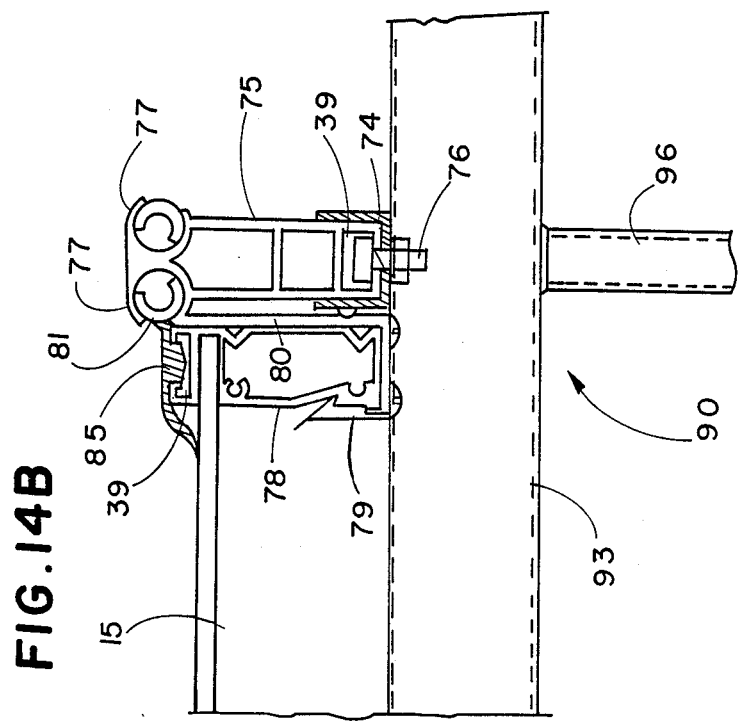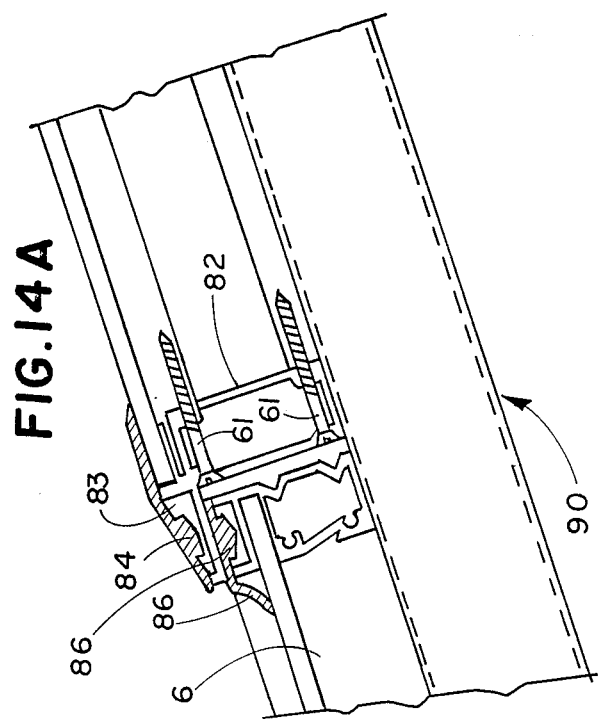

CURVED GLAZED ROOFS

FIELD OF THE INVENTION

The present invention concerns curved glazed roofs forming a continuous vault for covered sites, and in particular, for greenhouses and the like having parts thereof which are movable for providing ventilation therefore, as a well as a method for the assembly thereof.

BACKGROUND OF THE INVENTION

It has long been recognized that it would be desireable to provide glazed roofs which have improved luminosity and resistance to weather and external conditions, which are relatively safe to work with and which are relatively light. While such roofs have applications for use in furnished areas, leisure spaces and covered galleries, they will be described herein by referring to a particular application: greenhouses having large vaulted ceilings.

Greenhouse cultivation is controlled, for certain types of agricultural products, by truely industrial criteria. The profitability of these cultivations depends sometimes on a narrow margin of benefit. Thus, the farmer must optimize all factors, one of the factors being the amount of sunshine.

The traditional greenhouses are generally assembled with large planar sheets of annealed glass of 4 mm of thickness. Unfortunately, the dimensions of these sheets can reach $1.12 \times 1.65$ m, which makes their handling difficult during assembly. Also, glass in the shape of a thin annealed sheet is relatively fragile and can only withstand a cold curving for large curvature angles, its constaint of rupture to traction being in the order of 50 $N/m^2$. Finally, in spite of the size of the panels, the luminosity inside the greenhouses does not exceed 75% of the luminosity outside of the greenhouse. Such a reduction in luminosity is especially important in that it is known that a 1% reduction of light corresponds to a reduction of production in the order of:

1.2% for vegetables,
0.9% for flowers to be cut,
0.6% for ornamental plants.

It is therefore advantageous to increase the average transparency of the walls and roofs of such greenhouses by using larger volumes, which are as light as possible, while taking into account their durability, and by reducing the sizes of the elements of the framework which form opaque surfaces.

In other applications, such as in the roofing of furnished areas, leisure spaces, and covered galleries, it is important that the roofing material and the framework provide to the whole, a large luminosity which, for reasons of security, is often incompatible with traditional roofs.

Another important problem concerns the resistance of the materials to the weather. The mechanical characteristics of the covering material must be able to withstand the weather and to maintain itself in all conditions. Thus, the covering material must be able to withstand elements, such as hail, without shattering or otherwise becoming damaged.

One method which is utilized for improving the mechanical resistance of a sheet of glass is tempering of the glass. There are two types of tempering commonly employed for glass: thermal-tempering and chemical-tempering.

Treatment of tempering (thermal or chemical) of the glass establishes: on one hand, permanent tensions (forces) of compression in the external layers thereof, resulting in the glass having a superior resistance to rupture and deflection; and, on the other hand, tensions (forces) of traction in the internal layers of the piece of glass, which has for result that, in case of breakage, the piece of glass divides itself into a large number of fragments, thereby reducing the risks of injury by laceration.

Sheets of chemically-tempered glass (Chemically-tempered by a treatment of diffusion of ions) present good characteristics of fragmentation in case of rupture. However, sheets of chemically tempered glass do not present a sufficient resistance to rupture under the effect of shock of small hard objects which deeply scratch the surface of the glass. This is due, at least in part, to the fact that the thickness of the layer in compression on the surface of the chemically tempered glass is only in the order of 50 $\mu$m. Thus, even slight scratches in the surface of a chemically-tempered sheet of glass can result in the scratching thereof. This fault of chemically-tempered glass is particularly important in the case of glass sheets having a large surface area, such as the windshields of automobiles.

French Pat. No. 2,138,711 proposes to remedy this inconvenience by maintaining a sheet of chemically-tempered glass in such a way that forces of compression, resulting from the flexed state, is existent in one of the sides. This side, thereby placed in compression, is then utilized as the "exterior face" of the realized article, that is to say, the face of the glass sheet which is exposed to the impact of small hard objects (for example, the exterior face of a windshield of an automobile). In this fashion, it is attempted to provide a chemically-tempered sheet of glass which has superior mechanical characteristics.

Unfortunately, the technique described in French Pat. No. 2,138,711 exclusively concerns chemically-tempered glass. This technique does not concern elastic-flexing of a thermally-tempered sheet of planar glass, in order to produce a curved sheet of glass whose convex surface is resistant to the impact of small hard objects. Finally, chemical-tempering is quite expensive, requiring a large energy input and still exposes the glass to shattering in the event that it is deeply scratched.

Because of the disadvantages described above, it is more desirable to utilize a sheet of glass which has been thermally-tempered. Thermal-tempering involves a thermal modification of the glass which strengthens it throughout its width. This means that its impact resistant qualities are not only found in the surface layers of the glass. Accordingly, even an impact which nicks the surface of the sheet of thermally-tempered glass will not necessarily result in the breakage thereof. Therefore, thermally-tempered (or hardened) glass exhibits a superior constraint of rupture over chemically-tempered glass, increasing in function corresponding to its degree of tempering, and which is able to withstand constraints of rupture of 200 $N/M^2$ or more. Elastic-flexing of this thermally-tempered glass further increases the mechanical strength of the glass due to the creation of forces of tension and compression in the external layers of the glass described above.

Accordingly, it can be seen that there remains a need for a curved glazed roof in which the glass sheets thereof have been both thermally modified, and elastically-flexed, so as to increase the forces of tension and compression thereof and which has its curvature maintained under constraint. It can further be seen that there remains a need for a greenhouse, or the like, which has such a curved glazed roof.

SUMMARY OF THE INVENTION

It is an object of the present invention to provide a thermally-tempered, curved glazed roof wherein the glass sheets thereof are resiliently-flexed to create a curvature therein that is maintained under constraint.

The present invention has for another object to realize a glazed roof and, in particular, a glazed roof for a greenhouse presenting both a better percentage of transmission of light than the traditional glazed roofs and a good mechanical resistance.

The invention has also for still another object to realize such a glazed roof according to a simple and fast assembly process which can be executed, in good conditions of safety, by unskilled labor, and which, by this fact, presents economical advantages.

Another object of the invention is to realize a greenhouse of large internal luminosity, which comprises such a roof and an unobstructing framework, the framework occupying a minimum amount of space on the ground.

The subject of the present invention is a curved glazed roof forming a continuous vault which extends along a longitudinal axis, and which is composed of a framework and a succession of curved glazed spans extending perpendicularly to this axis. Each of these spans is composed of two or more juxtaposed curved glazed panels. Each of these panels comprises a substantially rectangular sheet of thermally-tempered glass, originally planar and curved when cold, and a curved frame adapted to maintain, under constraint, the curvature of the sheet of glass. This frame is formed by the assembly, by their opposite ends, of substantially straight frame sections, which are arranged along the substantially straight sides of the glass sheet, and of substantially curved frame sections, which are arranged along the substantially curved sides of the glass sheet. The edges of the glass sheet are inserted in a slot formed in the frame sections along the internal face of the frame. The curved glazed panels forming said span are joined with each other by joining the straight frame sections of the panels that are side-by-side. The successive spans, which form the glazed roof, are joined together by joining the curved frame sections of the curved glazed sheet which forms these juxtaposed spans.

The sheets of glass which are constrained by the curved frame, are made up of glass which is thermally-tempered. These sheets are originally planar and are curved when cold. In the present case, the term "thermally-tempered glass" covers equally, both the said "thermally-hardened", as well as the laminated glass composed of two sheets of thermally-tempered or hardened glass which is joined by an intermediate layer of transparent plastic-like adhesive material, such as polyvinyl butyral.

In a form of preferred embodiment of the invention, a tie beam is arranged transversly in the plane separating two successive spans. This tie beam joins the lower corners of the curved glazed panels disposed at the extremities (the distal ends) of each span.

According to a particular embodiment, a plurality of struts are provided. At least a portion of these struts have a first end which is secured to the corners of the curved glazed panels (the first and second ends of the respective panel joints) and a second opposite end which is secured to a respective tie beam situated in the corresponding transversal (the same vertical) plane.

According to another particular embodiment, at least a portion of the struts have a first end which is secured to the curved frame sections and a second end which are secured to the corresponding tie beam disposed in the same vertical plane as the struts. Preferrably, two such struts are provided for each panel which are fixed to these curved frame sections on both sides of their point of junction.

According to yet another embodiment, the framework comprises trusses comprised of a curved extrados section and a tie beam. These trusses are arranged perpendicularly to the axis of each span, under the curved frame section of the curved glazed sheets, which they support. These trusses include, preferentially, at least a portion of the struts having a second opposite end secured to the tie beam and a first end which is secured to a respective curved extrados section, at, preferably, the place of junction of the corners of the curved glazed panels (the position where the panel joints are supported thereon). According to a preferred embodiment, a first end of a tightening section is secured to the summit (the position thereof substantially equidistant between the first and second opposite ends) of the curved extrados section. The second end of each tightening section is secured to each point of junction between this curved extrados section and the tie beam. According to another variant embodiment, the extrados section of each truss is secured to the tie beam by cables.

In an embodiment of the roof according to the invention the spans rest by their low point (a straight frame section) on longitudinal beams which extend substantially parallel to the longitudinal axis of the roof.

In a preferred embodiment of the roof, the longitudinal beams are hollow sections which serve both as a support for the roof and as a gutter for the evacuation of rainwater.

In a particular embodiment of the longitudinal beams, the upper part (uppermost portion) of the longitudinal beams comprises an upper trough. On either side of this upper trough, notches are formed whose shape corresponds to the external profile of the frame of the curved glazed panel. Openings, arranged along both the lowest line of this upper trough and of these notches, place them in fluid communication with the internal volume of the longitudinal beams in such a way as to allow the passage of trickling water therebetween.

In a particular embodiment of the invention, the roof comprises spans which tilt and swing with their tie beams about a pivot point around a horizontal axis which is situated on one of the two longitudinal beams on which the respective spans are supported. The pivoting of the span takes place around a dislocating hinge, whose fixed part is constituted by an outwardly-extending cylindrical rib that is integral with the longitudinal beam. The one of the straight frame sections of a mobile panel of the span is integral with an outwardly-extending curved latch finger having a latch seat formed therein. The latch seat is in the form of a cylindrical arch to receive, engage and removably secure the rib therein. Such a roof is equipped with means adapted to maneuver these tilting spans and to maintain them in either an opened or a closed position. Moreover, in such a roof, during the construction thereof, supplemental tie beams are advantageously arranged in a tranversal manner between the longitudinal beams in the vertical planes separating two successive spans.

According to another embodiment of the invention, the roof, comprises mobile span portions, each being constituted of at least on mobile curved glazed panel secured by one or more hinges to the framework of the greenhouse. The lower edge (the straight frame section) of the frame of the said mobile span portion is removably secured to the upper edge (the peak beam) of the framework by a latch means when the opening part is in the closed position. This mobile span portion also includes means able to maneuver it and to maintain it in both the open and closed positions.

According to a particular embodiment of the roof, the mobile span portions are arranged on either side of a peak beam, which is a constituent element of the framework. The hinge is formed to removably secure the mobile span portions. This hinge has an outwardly-extending fixed part, constituted by a cylindrical rib carried by the peak beam, and a latch having a latch seat in the form of a cylindrical arc, which is integral with one of the straight frame sections of the mobile span portions.

In accordance with the teachings of the present invention, half or even less than half of the panels in at least one of the spans are secured to the mobile panel that is pivotably secured (to the peak beam, the longitudinal beam, the curved extrados section or any other structure of the framework) such that half, or less than half of the span pivots about the pivot point.

According to a variant embodiment, the trusses and the spans rest by their low point on the longitudinal beams, which extend parallel to one another, perpendicular to the longitudinal axis of the vault of the roof. These longitudinal beams are hollow sections which, in part, serve as a gutter for the evacuation of rainwater. These hollow sections comprise, at their uppermost part, an upper trough. These hollow sections also have lateral faces which are adapted to the shape of the frame sections and to the extremities of the extrados sections of the trusses which rest upon them. Each said truss is also fixed on a jaw (clamp) which is positioned underneath and extends at least partially about the longitudinal beam for receiving and supporting the beam. A tightening organ is disposed between the two parts of this jaw to insure the immobilization of the said truss in relation to the longitudinal beam. The openings (apertures) formed in both the lowest line of the upper trough and in the notches, places these parts in fluid communication with the internal contents of the longitudinal beam, in such a way as to permit the passage of trickling waters therebetween.

According to a preferred embodiment of the invention, the longitudinal beams are supported by columns. Advantageously, these columns are also hollow and are in fluid communication with the fluid conduit defined in the longitudinal beams, serving as a descent for the waters collected in the longitudinal beams (gutters).

The invention has equally for an object a greenhouse which comprises a roof, such as is hereinabove defined, and lateral walls constituted by planar glazed panels framed by sections of a similar type as the sections used for the frames of the curved glazed panels forming the roof.

In an advantageous embodiment of the invention, the greenhouse constructed according to the invention, comprises glazed panels equipped with an overglazing. This overglazing is constituted by a glass sheet which is maintained in a parallel manner to the glazed panel by frame sections which are joined by elastic interlocking in inverted T-slots formed in the frame sections of the glazed panels which constitute the greenhouse.

Another object of the invention is a process for the assembly of a roof conforming to the invention. This process includes thermally-tempering at least two sheets of glass, whereby two sheets of thermally-tempered glass are formed. The thermally-tempered sheets of glass are cooled, whereby two thermally-tempered, cold sheets of glass are formed. The two thermally-tempered, cold sheets of glass are then curved at a temperature being less than 140° C., whereby two thermally-tempered, cold-curved sheets of glass having a resiliently-flexed curvature formed therein are formed. The resiliently-flexed curvature of the two sheets of glass is maintained under constraint. Finally, the resiliently-flexed sheets of glass are secured to one another, such that the sheets of glass are juxtaposed to one another.

If desired, the curving is performed by providing a template. The cold, thermally-tempered sheets of glass are placed on the template, and pressure is applied to the cold, thermally-tempered sheets of glass, such that a resiliently-flexed curvature is formed in each sheet of glass.

It is preferred that the resiliently-flexed curvature of the two sheets of glass is maintained by assembling a frame about each respective thermally-tempered, cold-curved sheet of glass and securing the frame to the said respective sheet of glass. In this fashion, the frame retains the curvature of the respective sheet of glass under constraint on the template and, at least two curved glazed panels are formed.

It is still further preferred to secure the panels positioned juxtaposed to one another, whereby a span is formed having a pair of distal panels. One end of a tie beam is secured to a portion of one of the distal panel of the respective spans. Another opposite end of the same tie beam is secured to a portion of the other distal panel of each respective span. One end of a respective strut is secured to the frames of the curved glazed panels forming the span. The other end of each strut is secured to the tie beam. One end of a temporary tie beam is secured to another portion of one of the distal curved glazed panels of each respective span. Another opposite end of the same temporary tie beam is secured to another portion of the other distal panel of each respective span. Each successive span so formed is then lifted and placed onto a framework, whereby the thermally-tempered, cold-curved glazed roof is placed. Finally, successive spans are secured to one another and at least a portion of the distal panels of the spans are secured to the framework, whereby the thermally-tempered, cold-curved glazed roof having successive spans of juxtaposed curved glazed panels is formed.

In further accordance with the teachings of the present invention, a process is disclosed for the construction of a greenhouse having a curved glazed roof. This process includes excavation of foundation holes. Bases are then placed in the foundation holes. Columns are then placed on the bases. Longitudinal beams are then placed on the columns, such that the longitudinal beams are substantially parallel to each other. Trusses are constructed. Each truss has a curved extrados section including two opposite ends and a respective tie beam including opposite ends thereof. The trusses are then placed between and perpendicularly to the longitudinal beams. The one end of both a curved extrados section and a tie beam of each truss is then secured to a longitudinal beam and the opposite end of both the curved extrados section and the tie beam of each truss is secured to another longitudinal beam. A peak beam is placed on the extrados section of the trusses, such that the peak beam is substantially parallel to the longitudinal beams. At least two sheets of glass are thermally-tempered, whereby two sheets of thermally-tempered glass are formed. The thermally-tempered sheets of glass are then cooled, whereby two thermally-tempered, cold sheets of glass are formed. The two thermally-tempered, cold sheets of glass are then curved at a temperature being less than 140° C., whereby two thermally-tempered, cold-curved sheets of glass having a resiliently-flexed curvature formed therein are formed. The resiliently-flexed curvature of the two sheets of glass is maintained under constraint. A frame is assembled about each respective thermally-tempered, cold-curved sheet of glass. The frame is then secured to the said respective sheet of glass, such that the frame retains the curvature of the respective sheet of glass under constraint. Also, in this fashion, at least two curved glazed panels are formed, further maintaining the resiliently-flexed curvature of the sheets of glass under constraint. The spans of curved glazed panels are then placed, such that one of the curved frame sections of each panel in the span lies on a respective curved extrados section and further such that the other of the curved frame sections of each panel in the span lies on another respective curved extrados section, and still further such that a straight frame section of a pair of opposite distal panels of each respective span is supported by a respective longitudinal beam. Finally, the curved frame sections of the panels of each span is secured to the respective extrados section upon which the curved sections are supported, whereby the greenhouse having the curved glazed roof is formed.

In further accordance with the teachings of the present invention, a process is disclosed for the assembly of a roof conforming to the invention. This process includes assembling, on a template, the glazed panels. Each of these panels includes a rectangular sheet of thermally-tempered glass, initially planar, curved when cold and a curved frame formed of frame sections, adapted to maintain the curvature of the sheet of glass under constraint. The straight frame sections of the juxtaposed curved glazed panels are secured to one another, forming a span. A tie beam is fixed joining two lower opposed corners to the span thereby constituted. Struts (braces) are secured to the tie beam and to the joined frames of the curved glazed panels forming the span. On the opposite side of the span, a temporary tie beam is assembled, joining the two other lower corners of this span. Each of the spans thereby created is then raised, in their entirety, by means of handling and the spans are successively placed on elements of support or of framework provided. Finally, the spans are secured between themselves and to the support elements or to the framework. The successive spans comprising the roof are secured between themselves by joining between them the curved frame sections of the curved glazed panels forming the juxtaposed spans.

The invention has for another object, a process for the assembly of curved glazed roofs having a framework which comprises trusses with extrados sections which support the curved glazed panels. In this case, the process includes excavation of the foundation holes at the site where the columns of the framework will be placed. The pedestals of the columns, which have been prefabricated, to define a sleeve of diameter corresponding to the columns are then placed. The covering caps are then placed on the columns. The columns are then placed in the respective sleeves of the pedestals. The longitudinal beams are then placed on the corresponding columns, parallel to the axis of the spans. The trusses are then assembled. The trusses are then placed between the longitudinal beams, perpendicular to the axis of the spans. A roof edge is assembled between the trusses. The trusses are then secured to the caps. The curved glazed panels are then placed and fixed on the trusses and the longitudinal beams. The mobile curved glazed panels are then placed on both sides of the peak beam and these panels are joined with the mobile part of the fixed hinges to the peak beam.

According to an advantageous mode of execution, the frames of the curved glazed panels are joined together and are fixed to the support framework by mean of bolt shafts equipped with enlarged heads received and supported in an inverted T-slot formed along these frames.

Since the curved glazed panels used for the construction of roofs and greenhouses can be of very large dimension, it will be understood that they can have therefore also have a very good percentage of transmission of light, the relationship between the opaque surfaces and the transparent surfaces being very small.

It is also to be understood that, the mechanical resistance of the roof is very good, due to the fact that a curved glass sheet is substantially more rigid than a planar sheet following the increase of its moment of inertia.

The roofs or greenhouses according to the invention can be assembled in a more simple and fast manner than is the case for roofs or greenhouses previously known. The fabrication of these roofs or greenhouses, according to the invention, can be done by unskilled labor since it essentially consists only of securing the framed glazed panels, to one another (for example by bolting). This assembly can be done in safe conditions, since it does not necessitate the manipulation of nonframed glass sheets.

These and other characteristics and advantages of the invention, will become apparent from the description of the particular modes of realization hereafter specified, reference being made to the figures.

BRIEF DESCRIPTION OF THE DRAWINGS

FIG. 1 is a perspective view of a traditional greenhouse.

FIG. 2 is a perspective view of a tunnel type greenhouse including a roof according to the present invention.

FIG. 6 is a detail view of a longitudinal beam of a greenhouse taken along line VI—VI of FIG. 2.

FIGS. 7A and 7B are, together, a cross-section view, with interruption, of a part of the roof of the greenhouse comprising a movable, openable curved glazed panel.

FIG. 13 is a cross-section view, with interruption, of a longitudinal beam of a greenhouse taken along lines XIII—XIII of FIG. 10.

FIGS. 14A and 14B are, together, a cross-section view, with interruption, of a variant of an openable panel of a greenhouse according to the invention.

DESCRIPTION OF PREFERRED EMBODIMENTS

Figure 4:
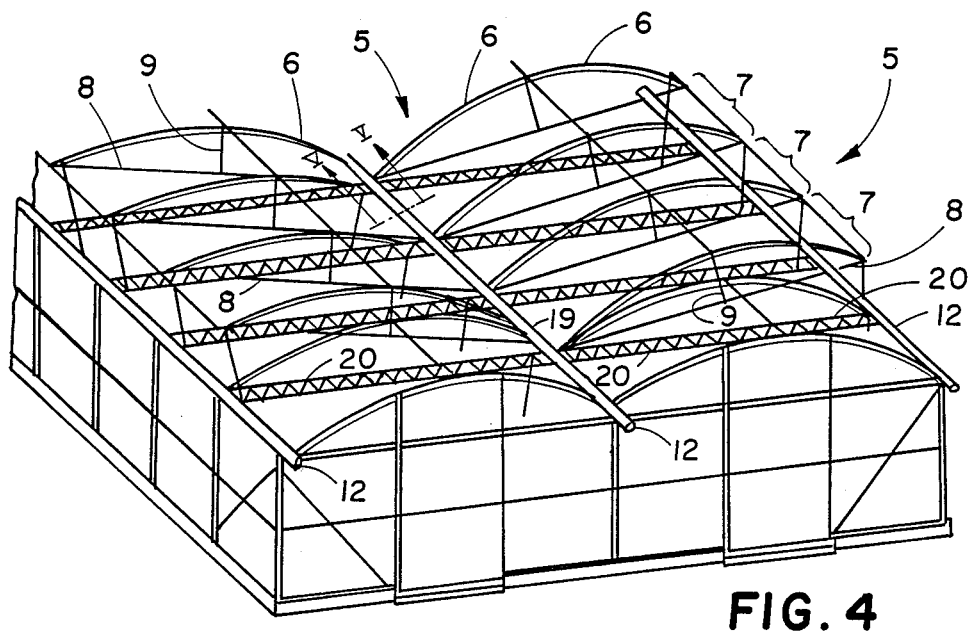
FIG. 4 is a perspective view of a greenhouse according to the invention wherein a portion of the spans are movable.

The traditional greenhouse shown in FIG. 1, is comprised of a series of relatively narrow vaults 1 which are joined side-by-side. The price of such a greenhouse increases substantially with the width of the spans. The windows 2 constituting the cover are of thin dimensions. The framework 3 and the supports of the window 4 are distinct from the material of cover, and form a closeknit network therewith.

The glass of these traditional greenhouses is in the shape of a thin annealed sheet that is relatively fragile and can only withstand a cold-curving for large curvature angles, its constraint of rupture to traction being in the order of 50 N/m².

Contrary thereto, the glass sheets of the curved glazed panels of the present invention are thermally-tempered. Thermally-tempered (or hardened) glass is more resistent. Its constraint of rupture, which increases in function to its degree of tempering, can reach 200 N/m² or more.

However, in practice, after curving, the constraint of extension of the convex side of the sheet of curved glass, in the conditions of utilization proposed, must be substantially less than the preconstraint of compression due to the tempering of the glass. This permits the glass to be safely utilized and which permits the glass to be used in panels to form a wall corresponding to the safety regulations in force. Moreover, such cold-curving (resilient-flexing) gives the glass a better resistance to impact, as can be seen by reference to the table herebelow:

| Glass | | | | |
|---|---|---|---|---|
| Dimensions mm | Thickness mm | Thermal Treatment | Radius Of Forced Curvature | Resistance To Impact (Joules) |
| 997 × 1650 | 3.8 | annealed | planar | 13 |
| 2000 × 3210 | 3.8 | tempered | 4.6 | 25 |
| 2000 × 3210 | 3.8 | tempered | 9.6 | 27 |
| 2000 × 3210 | 4.8 | tempered | 9.6 | 34 |

For the appreciation of this table, it is noted that hail is able to attain a kinetic energy of 20 joules.

FIG. 2 is a perspective view of a "tunnel" greenhouse whose roof is constructed with the elements, and according to the process, of the invention.

The roof 5 is comprised of curved glazed panels 6 which are directly joined to one another to form the various arched glazed spans 7 of the vault of the roof 5.

Each tranverse row of panels 6 form a span 7. The lower corners of the straight frame sections of the distal panels 6, in the extreme (distal) position of each span 7, are secured together by a tie beam 8. Tie beam 8 supports the lateral forces exerted on the roof 5. Struts 9 secure the junction of four panels 6 to the corresponding tie beam 8. Every other one of the tie beams 8 includes, amongst other things, a brace 10 which is supported on a corresponding column 11. These columns 11 also support the longitudinal beams 12, on which rests a straight frame section of the distal panels of the spans 7.

The window panels mounted in the lateral walls 13 of the greenhouse are secured to frame sections 14. Frame sections 14 are similar to the frame sections used for the curved glazed panels 6 which constitute the roof. This reduces the cost of the production.

The aeration of the greenhouse is insured by the rotation of the mobile curved glazed panels 15 forming windows, around an axis which is situated on the peak beam 16 of the greenhouse.

This aeration is effectuated, according to the orientation of the wind, by lifting, with the aid of appropriate means (for example, with racks 17), the mobile panels (movable span portions) 15 which are situated on one and/or the other of the slopes 18 of the spans of the roof 5.

A vault of a greenhouse comprising a roof 5, according to the invention, has many advantages. It can cover a surface of the ground which is equivalent to that of many vaults of many traditional greenhouses, without the framework being heavier. Also, it has an increased resistance to the elements, including hail. Finally, the relationship between the opaque surfaces and the transparent surfaces of the vault are substantially reduced.

Figure 3:
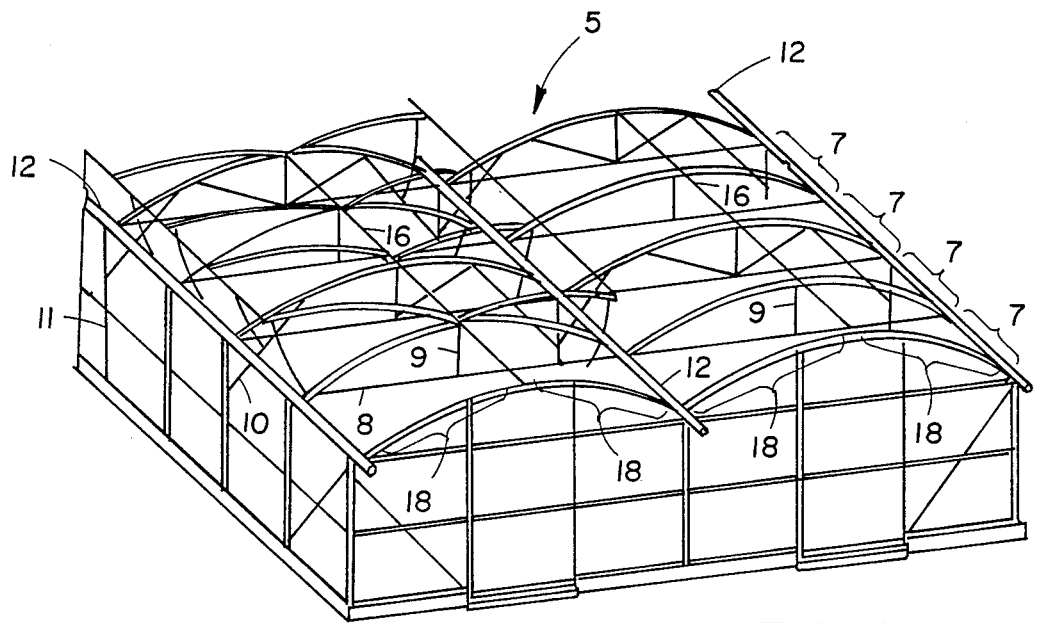
FIG. 3 is a perspective view of a greenhouse with two vaults according to the invention, wherein the entire spans are movable.

FIG. 3 is a view, in perspective, of a greenhouse covered with a roof 5 according to the invention. In this embodiment, the entire slope 18 of a span 7 (a movable span portion) pivots between a first position, wherein the movable portion of the slope is closed, and a second open position, wherein the movable portion of the slope is opened being moved towards the top, around an axis (about a pivot point) which is situated on the peak beam 16. Each slope 18 of the roof is comprised of at least one curved glazed panel 6 having an angle of curvature in the order of, preferrably, 4.5 m, more or less, which gives it good rigidity.

FIG. 4 is a view, in perspective, of a greenhouse equipped with a roof 5 according to the invention, wherein the entire span 7 is mobile. These mobile spans 7 are comprised of curved glazed panels 6 and the tie beams 8 and struts 9 which are secured to these panels 6.

Dislocating hinges 19, hereafter described by reference to FIG. 5, removably secures another straight end of at least one of these same mobile spans (or movable span portions) 7 to the longitudinal beam 12, on which they rest.

Beams 20 are disposed transversly to insure the maintenance of the longitudinal beams 12 while the spans 7 are tilted.

Figure 5:
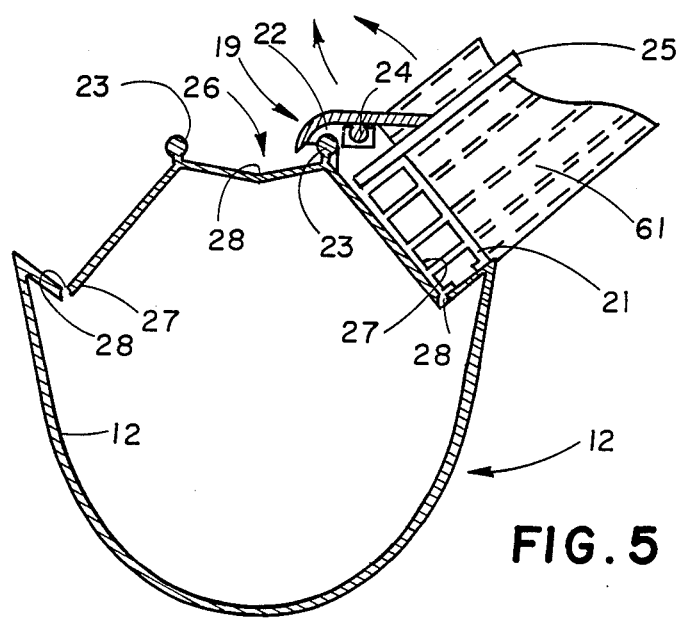
FIG. 5 is a detail view of the hinge of the greenhouse taken along lines V—V of FIG. 4.

FIG. 5 is a cross-section view of a longitudinal beam 12 carrying a dislocatable hinge 19 of the greenhouse described with reference to FIG. 4.

The another straight frame sections 21 of the curved glazed panels 6, which are removably secured to the beam 12, includes a latch means. The latch means is lengthened, on the external side, by a curved latch finger (tongue) which is in the shape of an arc of a circle 22, forming a latch seat (rounded groove). An outwardly-extending cylindrical rib 23, formed and carried by the longitudinal beam 12, is received in the latch seat. This rib 23 is engaged by, and removably supported in, the latch seat when the span is moved into the first closed position, such that the rib is removably secured in the latch seat.

A watertight frame section 24 guides the trickling water down along the thermally-tempered glass sheet 25 towards an upper trough 26 which is arranged on the upper part (uppermost portion) of the longitudinal beam 12. In this manner, the stagnation of trickling water between the sheet of cold-curved, thermally-tempered glass 25 and the frame section 21 is prevented. This watertight frame section 24 further prevents water from entering between adjacent panels.

Each longitudinal beam is hollow defining a fluid conduit therein. Each of the longitudinal beams 12 have, on either side, a plurality of notches 27 formed therein. The section (shape) of these notches 27 corresponds to that of the frame sections 21 of the curved glazed panels which are received on the longitudinal beam. The lower angle of this notch 27 has at least one perforation (opening) 28 formed therein, which place it in fluid communication with the fluid conduit (interior volume) of the longitudinal beam 12. The upper trough 26 formed on top of the longitudinal beam 12 also has at least one opening (orifice) 28 formed therein which place it in fluid communication with the fluid conduit of the longitudinal beams 12. In this fashion, the trickling water coming from the rain, as well as condensation, passes to the inside of the longitudinal beam 12 which then serves as a gutter. From these longitudinal beams 12, the water descends towards a point of collection by a fluid conduit, defined within the hollowed columns 11 of the framework, which is in fluid communication with the fluid conduit of the longitudinal beam 12.

The FIG. 6 is a cross-section view of a longitudinal beam 12 of a greenhouse according to FIG. 2. A rounded hinge (mount) 29 passes under and extends at least partially about the longitudinal beam 12, removably embracing the curvature of the beam 12. On the external side of the greenhouse, a hook 30 is supported in the external notch 27, formed in the beam, in such a way as to immobilize the longitudinal beam 12. On the interior side of the greenhouse, the longitudinal beam 12 is secured to the frame 31 of a curved glazed panel. This panel is, in turn, engaged in the internal notch 27 formed in the beam, said internal notch being symmetrical to the external notch 27.

A V-mounting (V-shaped clamp) 32 ties the frame 31 of the curved glazed panel 6 to the other opposite end of the mounting 29 which passes underneath the longitudinal beam 12. This V-mounting 32 has a mounting bracket having one end secured to the ends of the tie beam 8 and a second opposite end. This mounting 32 ties the two extremities (distal panels) of the span 7.

The V-mounting 32 has a second opposite end that is curved by a right angle at a middle portion thereof between the end portions thereof which engages itself in a notch 33 formed in the frame 31 of the curved glazed panel forming the bottom of the span 7.

The lateral greenhouse wall 13 comprises a window and a overglazing joined by the elastic interlocking of their respective frame sections.

FIGS. 7A and 7B are, combined, a cross-section view, with interruption, of a movable span or a movable span portion 7 of a greenhouse, as shown in FIG. 2, which includes mobile portions 15. A fixed frame 34, of dimensions equivalent to those of the curved glazed panel 6, is fixed in the span. The frame 34 is topped by a mobile curved glazed panel 15 of corresponding dimensions. This frame 34 and this panel 15 are adjusted in a joint manner. The mobile panel 15 pivots around a hinge 35 which is longitudinally disposed over the peak beam 16 of the span 7. The frame sections 21 constituting the frame 31 of the mobile panel 15 are prolonged by a C-shaped part 36 having a substantially C-shaped hinge seat formed therein. This part 36 forms the mobile part of the hinge which can pivot around the outwardly-extending cylindrical rib 37 integral with the peak beam 16 (or, if desired, the extrados section or longitudinal beam) of the roof 5.

Flexible joints 38, are fixed in the slots 39, being arranged along the frame 34, in order to insure the watertightness of the closure. A frame section 40 of the mobile panel 15, opposed to the frame section 21 forming the hinge, is extended by a triangular housing, thereby improving the evacuation of the trickling water. The frame section comprises a slit 41 and perforations 42, which permit the evacuation of the water of condensation which forms on the internal face of the window of the curved glazed panel 15. The struts 9 are secured to the curved glazed panels 6 and the fixed frame 34 to the corresponding tie beam 8.

Figure 8:
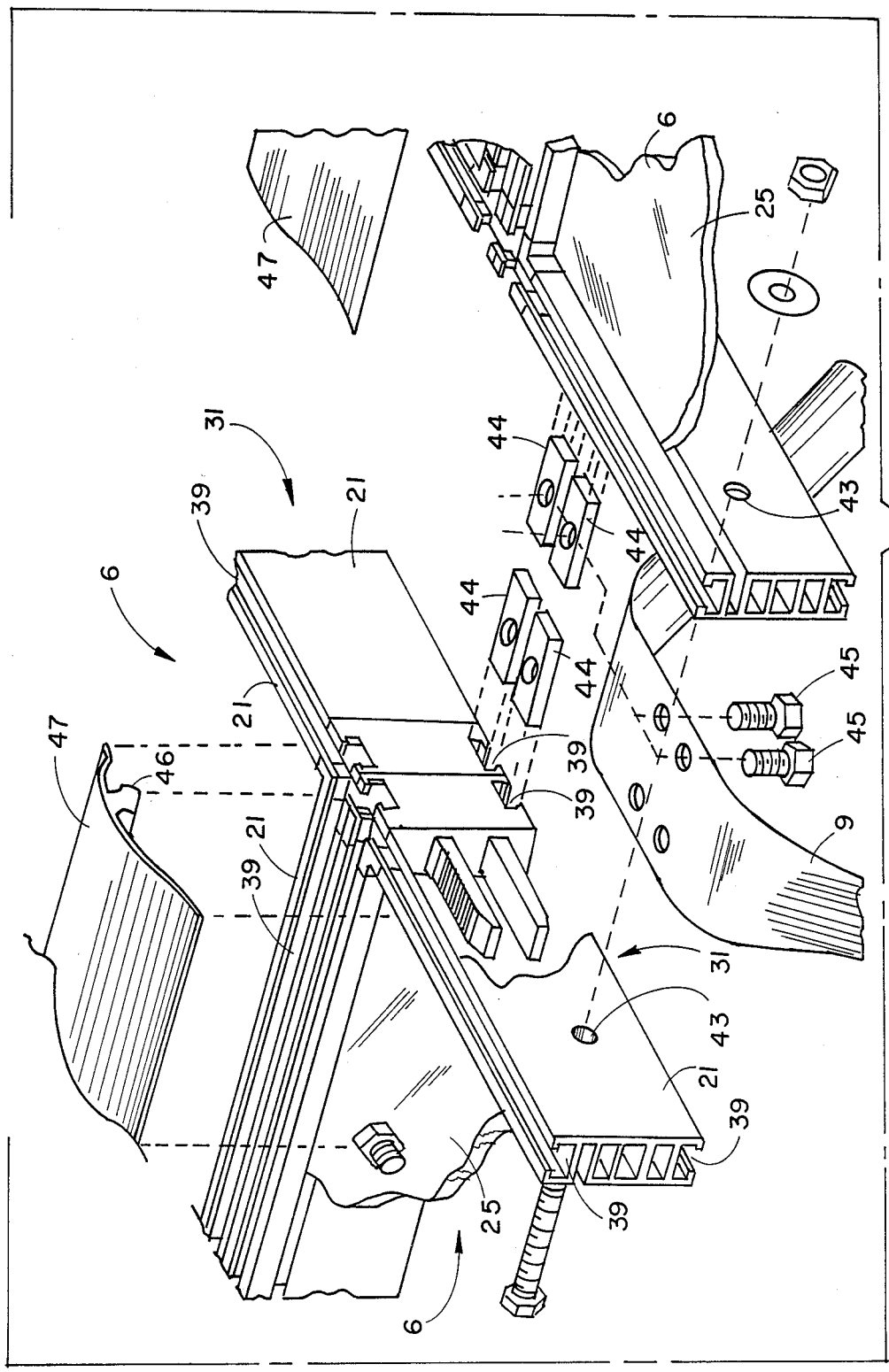
FIG. 8 is an exploded view, with parts broken away, of an assembly joint of four fixed curved glazed panels of the roof according to the invention.

FIG. 8 is an exploded view, with parts broken away, of an assembly joint of four curved glazed panels 6, forming the roof 5 according to the invention. The curved glazed panels are represented joined two-by-two, and are equipped with two types of means of assembly.

Tapped apertures 43, which extend perpendicularly to the internal face of the frame sections 21, are spaced along the frame 31. Two adjacent curved glazed panels 6 can thereby be joined by simple bolting using common threaded bolts which are disposed through these apertures.

Moreover, enlarged heads (rectangular nuts) 44 carried on both opposite ends of a bolt shaft can be received in the inverted T-slots 39, which extend longitudinally along the sections 21. The elongated shape of these heads 44 disperses the tension, avoiding a localized deformation of the edges of the inverted T-slot 39.

By introducing the bolt shaft (a screw) 45 in the tapped hole formed in the nuts 44, one can, if desired, fix the frame 31 to struts 9 of the framework 3, as is shown in the drawing. On the upper face of the frame section 21, inverted T-slots 39 permit the insertion of a downwardly-extending anchoring extension 46 of a watertight flexible section 47, having a pair of downwardly-extending sloped portions formed thereon. Watertight section 47 covers the junction between two adjacent panels 6, forming a watertight seal, preventing the entry of water into this junction.

Figure 9:
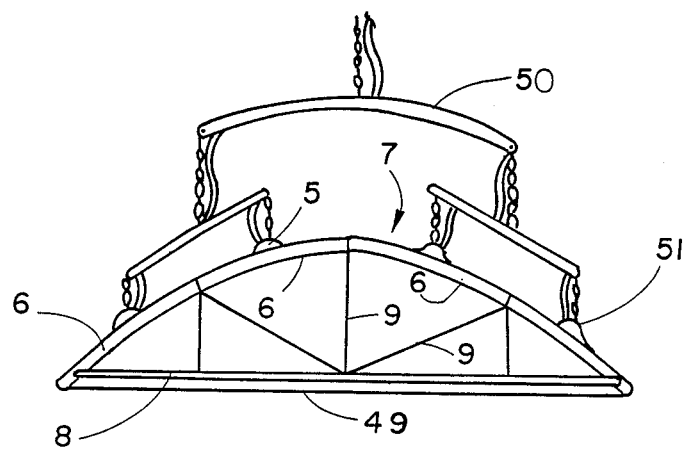
FIG. 9 is a schematic view of a phase of execution of the process of assembly of a span of the roof according to the invention.

FIG. 9 is a schematic view of a step of the assembly of a roof 5 according to the invention. A complete span 7, composed of four joined curved glazed panels 6, has been assembled on a template. Since each tie beam 8, is shared by two spans 7, the two tie beams 8 can not be assembled to the spans prior to their placement on the structure. To avoid damage from the forces of torsion that occur during assembly, a temporary tie beam 49 is hooked (secured) to the two straight frame sections of the distal panels of the span 7. A handling machine 50, equipped with suction discs 51, lifts the ensemble of the spans 7, thereby consolidated, and places it on the framework 3, where it can be fixed by bolting. While the span 7 also comprises mobile panels 15, these are joined during handling by a joining piece which ensures the rigidity of the ensemble.

Figure 10:
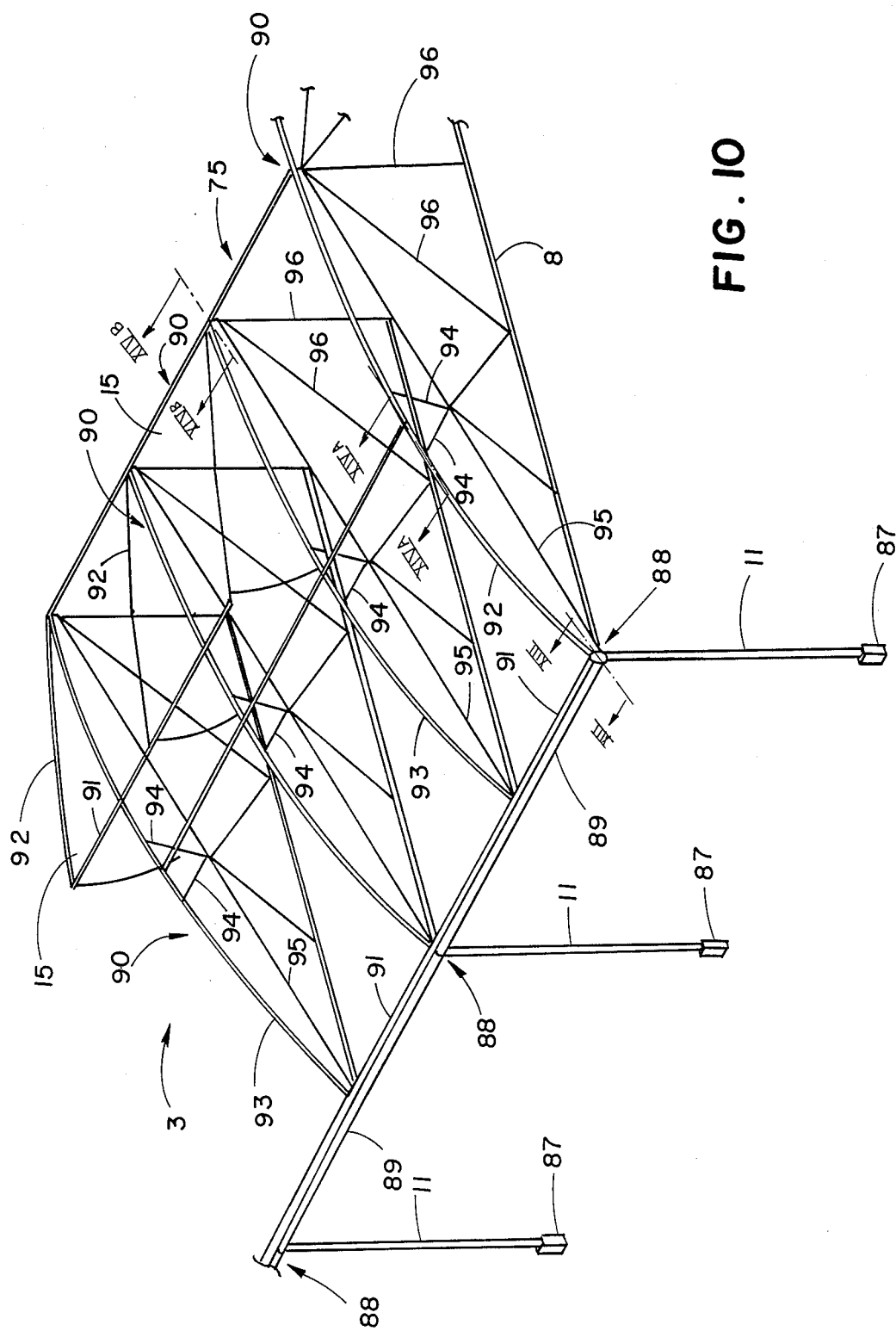
FIG. 10 is a partial view, in perspective, of an embodiment of a trussing for a greenhouse according to the invention.

FIG. 10 shows a part of the framework of another embodiment of greenhouse according to the invention, which illustrates another technique of quick assembly that is advantageous for the building of greenhouses in series.

Holes are excavated at the building site where the columns 11 are to be placed.

Little bases in cement 87, for supporting and maintaining the columns 11, are prefabricated. They present, at their top, a cylindrical sleeve having a diameter corresponding to that of a respective column 11. These bases 87 are placed o the building site of the greenhouses in the holes excavated at the site where the columns 11, will be placed. These bases 87 are then sealed in place by cement. The columns 11 are covered by the covering caps 88, and are glided in place in the sleeves of each of the bases 87. This operation can be done directly with, for example, a motorized engine.

The longitudinal beams 89 are thereafter placed on the corresponding columns 11 by use of a light manipulating engine, such as a crane mounted on a truck. The trusses 90 are brought, preferrably already assembled, on site. The handling of these trusses is easy since, because of the conception of the greenhouse, they are very light.

The trusses 90 are arranged between the longitudinal beams 89 and the ends of the trusses are secured thereto. Finally, the peak beam 16 of the framework is placed thereon, this last operation being able to be realized by a man raised in a mobile basket. The covers (covering caps) 88 are then tightened, an operation which will be explained further by referring to FIG. 13.

The framework 3 being thereby assembled, one proceeds to place and secure the curved glazed panels 6 to the extrados sections. In this manner, the span 7 are secured, so that, at the bottom (the distal end) of each slope, one of the straight sides 91 of a distal panel rests on the longitudinal beam 89, and further so that the curved sides 92 rest on the extrados section 93 of the truss 90 being fixed thereon by, for example, the aid of clips (jaws).

Finally, one assembles the mobile curved glazed panels 15 to the mobile part of the hinge of the peak beam of the roof. This can equally be done with the aid of clips (jaws). In the greenhouse hereby represented, the (simple) struts 9, secured to the junction between two curved glazed panels 6, may be replaced by a double strut 94, which improves the dispersion of the forces on the frames. A stiffening section 95 ties the covering 88 and the peak beam 16. This section 95 is intended to eventually guide a lightshade which can be unwound along the slope.

The ties between the peak beam 16 and the tie beam 8, prompted only in traction, are insured by cables 96.

Figure 11:
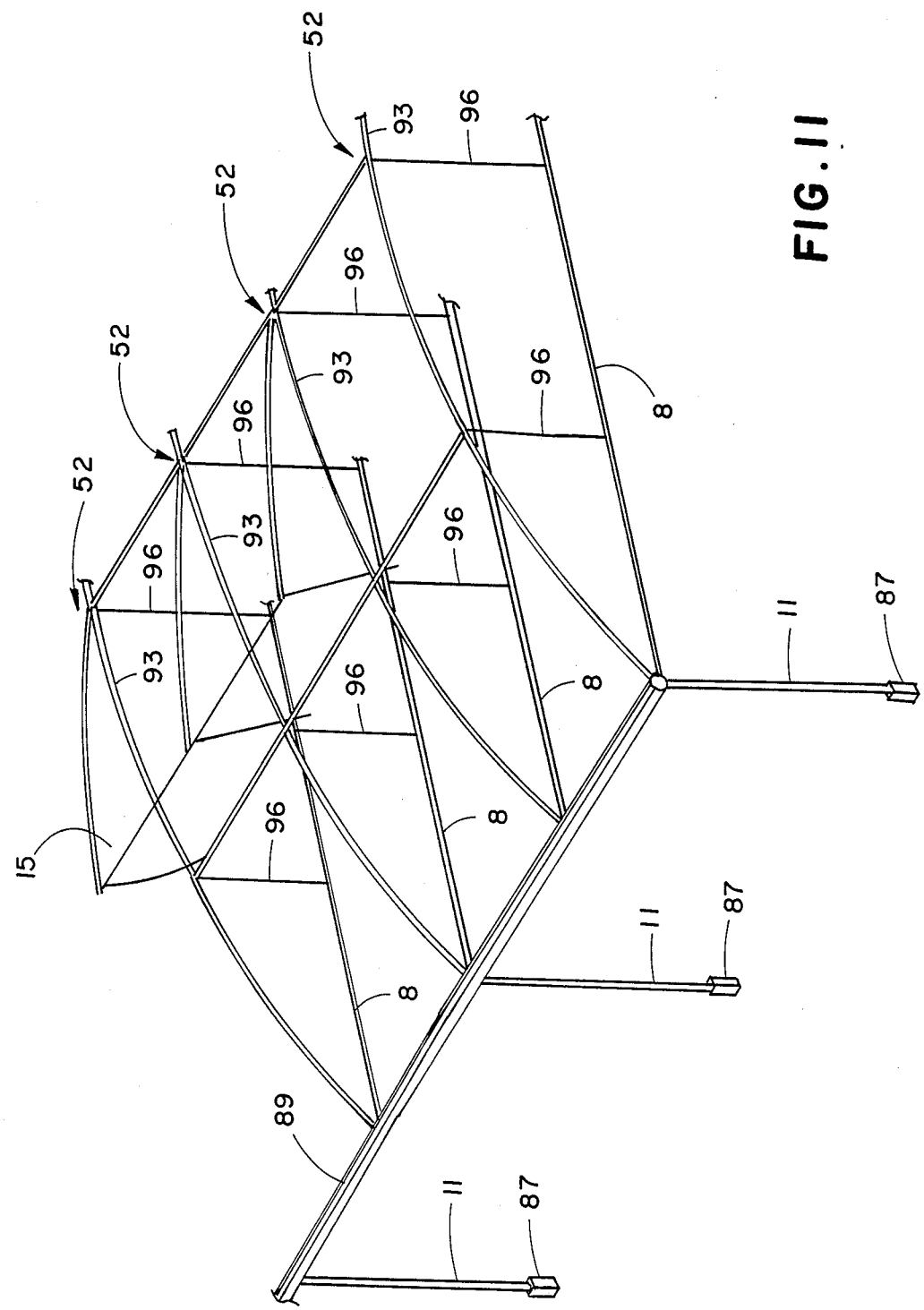
FIG. 11 is a partial view, in perspective, of another embodiment of a trussing for a greenhouse according to the invention.

FIG. 11 shows a simplified form of the truss 52 which permits the realization of a greenhouse which is even more luminous. The struts between the tie beam 8 and the reinforced extrados 93 of the truss are replaced by cables 96. These cables have a first end secured to the extrados section of the truss and a second opposite end secured to a tie beam of the same truss.

Figure 12:
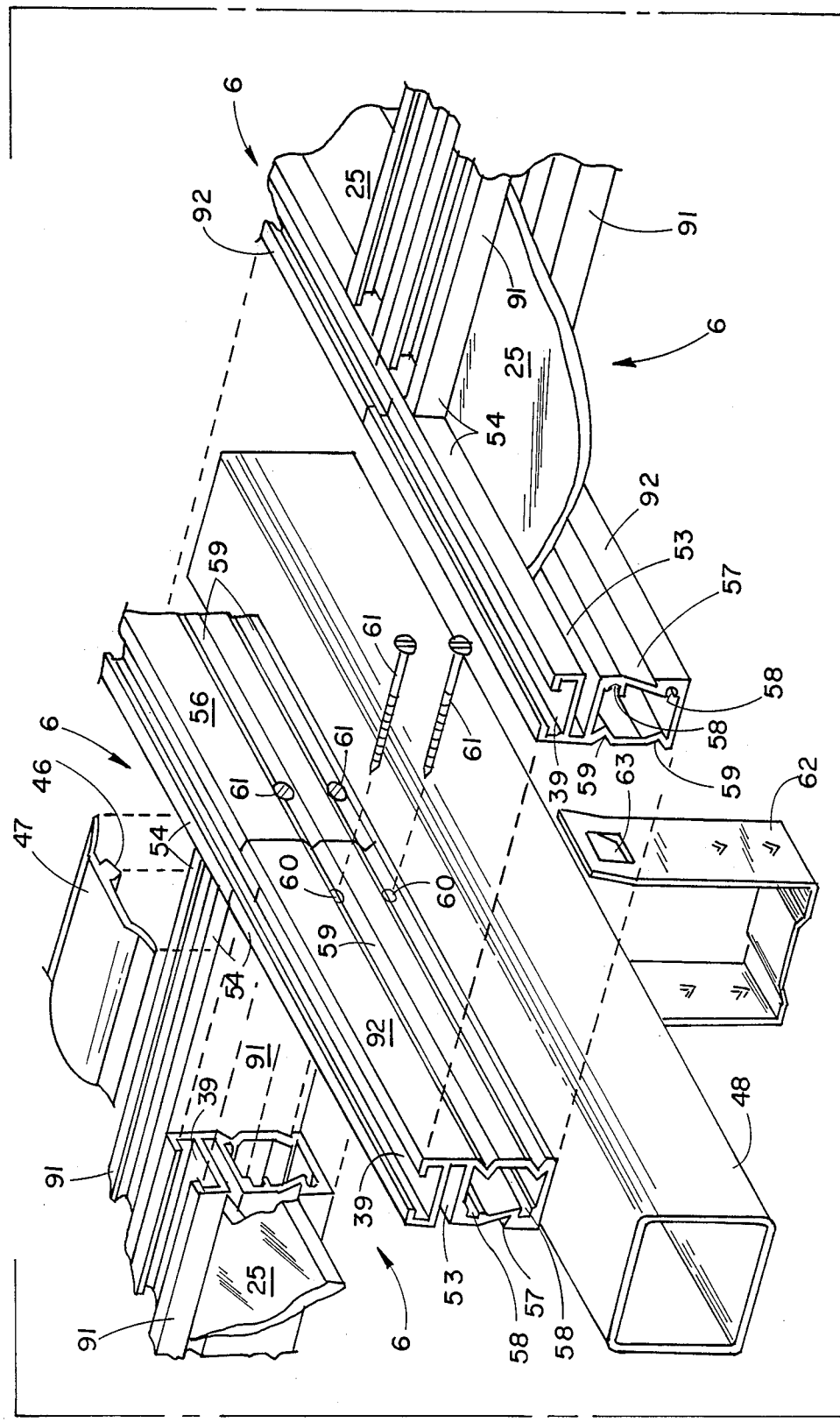
FIG. 12 is an exploded view, with parts broken away, of an assembly joint of a variant of the panels of a greenhouse according to the invention.

FIG. 12 shows another form of assembly. It is a exploded view, with parts broken away, of another way of both executing an assembly joint of four curved glazed panels 6 equipped with a different type of frame, and of the fixation of these panels 6 on an element of the framework 93.

In this form of execution, a curved glazed panel 6 comprises a thermally-tempered sheet of glass 25. This sheet of glass 25, initially planar, is elastically curved and its edges are inserted in a contiguous longitudinal slot 53. Slot 53 is formed on the internal face of frame 54, by the assembly of two curved sections 92 and two straight sections 91, which present the same transversal section.

The upper part of the frame sections 91 and 92 are identical to that of the sections 21, described above, and present therefore a longitudinal inverted T-slot 39 which is opened at the top.

The face of the lateral side walls of the frame sections 91 and 92, which are oriented facing the interior of the frame 54, have the longitudinal slot 53 formed therein in which is inserted the edge of the framed sheet of glass 25.

Underneath the longitudinal slot 53, the sections 91 and 92 are substantially hollow having a cross-section which is in the general form of a rectangle.

One of the lateral side walls of these frame sections is oriented towards the inside of the frame 54. On the external face of this lateral side wall, a groove 57 is formed. This groove 57 has a lower face forming an acute angle (edge of anchoring) with the part of this wall that is situated underneath this groove 57. On the interior face of this lateral side wall, two pairs of ribs are formed. Each pair of ribs forms a split cylindrical tubular sheath 58. Another lateral side wall of these sections which is oriented towards the exterior of the frame 54, has two grooves 59 formed on the exterior face thereof. The bottoms of the grooves 59 are positioned, respectively, at the same level as the axis of the split cylindrical tubular sheath 58.

As is shown in FIG. 6, the frame sections 91 and 92 are joined together to form the frames 54 of the curved glaze panels 6. Tapped holes (apertures) 60, situated at the level of the grooves 59, are formed through the two lateral side walls of the section 92, in relatively close proximity to their opposite ends. Threaded screws 61 pass through the holes 60 and are engaged and received in the little split cylindrical tubular sheaths 58 of the frame sections 91. In this fashion, the opposite ends of the frame sections 92 are joined with the opposite ends of another frame section 91 which it abuts. The heads of screws 61 are inserted and engaged in grooves 59.

The extrados section 93, on which rests the frames 54 of the curved glazed panels 6, has a width which corresponds to two times the width of a frame section 92. U-clips (jaws) 62 are positioned under and extend at least partially about the extrados section and the frame sections 92 to join two frame sections 92, placed back-to-back. The jaw has a resiliently-biased lug formed thereon which extends inwardly (being inwardly biased towards the extrados section) and which are inserted in the grooves, removably securing the curved panels on the extrados sections 93. To this end, each of the vertical branches of a clip 62 includes an elastic (resiliently inwardly-biased) lug 63 which engages itself in the groove 57 of a section 91 (or 92).

On the upper face of panels 6, the inverted T-slots 39 of sections 91 and 92 permit the insertion of an anchoring extension 46 of watertight section 47, thereby covering the joint between two juxtaposed panels 6 in the same manner as described above.

FIG. 13 is a cross-section, showing the longitudinal beam of a greenhouse according to FIG. 10, at the height of a covering 88.

Column 11 is covered by a covering 88. The lower part of this covering 88 is equipped with a collar 64 which is interlocked in the upper extremity of column 11. This covering 88 comprises V-shaped jaws 65, whose shape corresponds to that of the lower part of the longitudinal beam 89, and extends at least partially about the beam forming a seat for the said longitudinal beam 8 to be removably received therein.

Jaws 65 are secured by a tightening organ 66 and are each prolonged by a pull 67 which aids in fixing of the truss 90.

These jaws 65 are mounted on the collar of the covering 88 by means of bolts 68.

The lower angle of the truss 88 here represented, is constituted by a liason shaft 69, which secures the tie beam 8, and the stiffening section 95, and is soldered on the extrados section 93.

This tightening shaft is fixed by bolting to the covering 88. The extremity of the extrados section 93 is bevel shaped 70. The point of this bevel 70 is received in a notch 71, of corresponding shape, which is positioned on the lateral face of the longitudinal beam 89.

While on tightens the V-shaped jaws 65 with the aid of a tightening organ 66, the extrados section 93 imbeds itself in the notch 71, insuring a solid tightening between the different pieces of the framework.

The straight frame section 91 of a curved glazed panel 6 adjusts itself against a projecting ledge 72 which runs along the longitudinal beam 89. Clips (not represented) join the curved frame section 92 of the curved glazed panel 6 with the extrados section 93 of the truss 90. A rollerlap 73 for shades is shown schematically to both the angle of extrados section 93 and to the stiffening section 95.

FIGS. 14A and 14B are, combined, a cross-section view, with interruption, of a mobile curved glass panel 15, of a movable span (or a movable portion of a span) that is positioned on a plane which is perpendicular to the longitudinal axis of a greenhouse according to FIG. 10.

The extrados section 93 of the truss 90, includes, joined with its middle point, a hinge including a U-shaped section (a mounting bracket) 74. The casings section 75 is adjusted, by bolting, on the section 74 constituting the peak beam 16. The section 75 comprises, at one extremity, a T-slot 39 which permits the joining thereof by bolts 76, to the U-shaped section 74. The other extremity of the section comprises two C-shaped hinge seats 77, forming the fixed parts of two hinges.

The upper straight section 78 of the mobile panel 15, which form windows, is immobilized by a clip 79 in a L-shaped section 80. The upper extremity of this section 80 is prolonged by an integral, outwardly-extending cylindrical rib 81, which is received and engaged in the hinge seat, forming a hinge with the C-shaped seat 77 of the casings section 75 that is integral with the peak beam 16.

With a difference to the system described in FIG. 7, the fixed panel 6 and the mobile panel 15, as positioned, are in the same alignment.

The straight frame section, which is opposed to the hinge formed of parts (77, 81), is a special section 82.

This frame section 82 is elongated towards the top by a triangular casing 83, thereby improving the evacuation of the trickling water.

A flexible joint 84, fixed to the upper part of the special section 82, and a flexible joint 85, fixed to the upper part of the section 78 of the mobile curved glass panel 15, contributes to avoid the stagnation of water in the frame of panel 15.

A flexible joint 86, fixed in the inverted T-slot 39 of frame section 55 of the fixed curved glass panel 6, insures the watertightness between this section 55 and the special section 82 (while the curved mobile glass panel 15 is in a closed position).

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A curved glazed roof, comprising:
   at least one continuous vault, said vault having at least two successive arched glazed spans;
   each span having at least two juxtaposed curved glazed panels;
   each panel including a thermally-tempered, cold-curved sheet of glass, said sheet of glass having a resiliently-flexed curvature formed therein, and each panel further including a frame secured to the sheet of glass and maintaining the resiliently-flexed curvature of the sheet of glass under constraint;
   each of the frames of the curved glass panels in each span being secured to the frame of another panel, such that the panels in each span are secured being juxtaposed to one another, whereby a span is formed; and
   at least one of the frames of one of the panels in one of the spans being secured to at least one of the frames of one of the panels in the other span, whereby the continuous vault having successive spans is formed.

2. A curved glazed roof, comprising:
   at least one continuous vault extending along a longitudinal axis, said vault having at least two successive arched glazed spans extending substantially perpendicularly to the longitudinal axis;
   each span having at least two juxtaposed curved glazed panels;
   each panel including a thermally-tempered, cold-curved sheet of glass having a resiliently-flexed curvature formed therein, each sheet of glass further having a pair of substantially parallel curved edges and a pair of substantially parallel straight edges, said panel further including a curved frame disposed about the edges of the sheet of the curved sheet of glass and adapted to maintain the resiliently-flexed curvature of the sheet of glass under constraint, said curved frame having a pair of parallel curved frame sections including a pair of opposite ends and a pair of parallel straight frame sections including a pair of opposite ends, each of the straight frame sections disposed along a respective straight edge of the sheet of glass and each of the curved frame sections being disposed along a respective curved edge of the sheet of glass, each respective opposite end of the straight frame sections being secured to a respective opposite end of one of the curved frame sections, and said panel further including means for securing each frame section to the edge of the sheet of glass along which the respective frame sections are disposed;

each of the curved glazed panels of each span being secured by one of the straight frame sections thereof to the straight frame section of at least one other curved glazed panel of the same span, whereby the arched glazed spans are formed having the panels in the same span being secured juxtaposed to each other; and at least one of the curved frame sections of the curved glazed panels in each span being joined to one of the curved frame sections of one of the curved glazed panels in another, successive span, whereby the continuous vault is formed.

3. The curved glazed roof of claim 2, further comprising:

the respective curved frame sections of at least a portion of the curved glazed panels in at least one of the spans being joined to respective curved frame sections of a respective curved glazed panels in another, successive span, whereby the continuous vault is formed.

4. The curved glazed roof of claim 2, further comprising:

each of the curved glazed panels being secured by at least one of the straight frame sections thereof to the straight frame section of another panel positioned juxtaposed thereto, thereby defining a panel joint therebetween, each of said panel joints having a first end and a second opposite end; and a portion of the curved glazed panels being secured at the curved frame sections thereof to the curved frame section of another panel positioned adjacent thereto.

5. The curved glazed roof of claim 4, further comprising:

the vault further including a framework having a pair of substantially parallel, longitudinal beams being positioned substantially parallel to the longitudinal axis; and each of the spans having a pair of opposite distal panels, one of the straight frame sections of each distal panel being received on a respective longitudinal beam, such that the spans are supported thereon.

6. The curved glazed roof of claim 5, wherein the framework of the vault is further comprised of:

a plurality of trusses, each truss positioned perpendicularly to the longitudinal axis and extending between and secured to each of the longitudinal beams, each truss including a tie beam having a first end and a second opposite end, each truss further including a curved extrados section having a first end and a second opposite end;

the tie beam and extrados section of each respective truss being disposed on substantially the same vertical plane; and the extrados sections being adapted to receive one of the curved frame sections of the curved glazed panels thereon, whereby support for the panels is provided 7. The curved glazed roof of claim 6, wherein the one end of each of the extrados sections being secured to the one end of the respective tie beam of the same truss, and further wherein the second opposite end of each extrados section being secured to the second opposite end of the respective tie beam of the same truss, and a respective clamp means for tightly securing the one end of each of the tie beams to the one longitudinal beam, and another respective clamp means for tightly securing the second opposite end of each of the tie beams to the other longitudinal beam.

8. The curved glazed roof of claim 7, wherein the clamp means is comprised of a substantially V-shaped clamp having a mounting bracket, said bracket having one end secured to the ends of each of the tie beams and said bracket further having a second opposite end, said bracket further having a middle portion between the ends thereof, said middle portion being secured to a respective longitudinal beam.

9. The curved glazed roof of claim 6, further comprised of:

a plurality of struts, at least a portion of said struts having a first end being secured to a respective extrados section and a second opposite end being secured to a respective tie beam.

10. The curved glazed roof of claim 9, further comprised of:

at least a portion of the struts having a first end being secured to one of the respective panel joints at one of either the first or second ends thereof and a second opposite end secured to a respective tie beam being disposed in the same vertical plane as the respective said strut, whereby support for the curved glazed panels is provided; and at least a portion of the struts having a first end being secured to a respective curved frame section of a respective curved glazed panel and a second opposite end secured to a respective tie beam being disposed in the same vertical plane as the respective said strut, whereby support for the curved glazed panels is provided.

11. The curved glazed roof of claim 9, further comprised of:

said first ends of each of the struts being secured to the respective curved extrados at a position being substantially the same as where the panel joints are supported thereon.

12. The curved glazed roof of claim 6, further comprised of:

a plurality of stiffening sections, each stiffening section having a one end secured to a respective extrados section substantially equidistantly between the first and second opposite ends thereof, and each stiffening section further having a second end secured to either the first ends or the second opposite ends of both a respective tie beam and a respective extrados section, whereby further support for the extrados section and the curved glazed panels positioned thereon is provided.

13. The curved glazed roof of claim 6, further comprised of:

each truss further having at least one cable, said cable having a first end secured to the extrados section of a respective truss and a second opposite end secured to the tie beam of the same truss, whereby further support for the truss is provided.

14. The curved glazed roof of claim 6, further comprised of:
a peak beam, said peak beam being disposed substantially coincident with the longitudinal axis of the vault, said peak beam being further secured to at least one of the extrados sections; and
means for pivotably securing one of the straight frame sections of at least one of the curved glazed panels of at least one of the spans to either a respective peak beam, longitudinal beam or extrados section about a pivot point, such that each of the pivotably secured curved glazed panels and the panels in the span secured thereto, may be selectively pivoted about the pivot point to which it is secured, between a first closed position and a second open position, whereby a movable span or movable span portion is defined.

15. The curved glazed roof of claim 14, wherein the means for pivotably securing one of the straight frame sections of at least one of the curved glazed panels of at least one of the spans to either a respective peak beam, extrados section or longitudinal beam about a pivot point is comprised of:
a hinge including a substantially C-shaped hinge seat carried by the one of either of the respective peak beam, extrados section or longitudinal beam to which the straight frame section is secured, and an outwardly-extending cylindrical hinge rib integral with the said straight frame section, said rib being pivotably received in said hinge seat for pivotably securing the panel to the said one of either the respective peak beam, extrados section or longitudinal beam for pivotal movement between a first and second positions.

16. The curved glazed roof of claim 14, wherein the means for pivotably securing one of the straight frame sections of at least one of the curved glazed panels of at least one of the spans to either a respective peak beam, extrados section or longitudinal beam about a pivot point is comprised of:
a hinge including an outwardly-extending cylindrical hinge rib integral with the one of the peak beam, extrados section or longitudinal beam, and a substantially C-shaped hinge seat carried by the pivotably secured straight section, said hinge rib being pivotably received in said hinge seat for pivotably securing the panel to the one of the peak beam, extrados section or longitudinal beam, for pivotal movement between the first and second positions.

17. The curved glazed roof of claim 14, further comprised of:
means for removably securing another straight frame section of the at least one of the curved glazed panel of the same movable span or movable span portion, said means including a latch means having an outwardly-extending curved latch finger formed on the said straight frame section, said curved finger having a latch seat formed therein, said means further including an outwardly-extending rib being formed on the roof, said rib being engaged by and supported in the latch seat when the span having the said straight frame section is moved into the first closed position, such that the rib is removably secured to the latch seat.

18. A greenhouse having a curved glazed roof, comprising:
at least one continuous vault, said vault having at least two successive arched glazed spans;
each span having at least two juxtaposed curved glazed panels;
each panel including a thermally-tempered, cold-curved sheet of glass, said sheet of glass having a resiliently-flexed curvature formed therein and each panel further including a frame secured to the sheet of glass and maintaining the resiliently-flexed curvature of the sheet of glass under constraint;
the frame of the curved glass panels of each span being secured to the frame of another panel of the same span, such that the panels in each span are secured being juxtaposed to one another, whereby a span is formed;
the frame of one of the panels in one of the spans being secured to at least one of the frames of one of the panels in the other span, whereby the continuous vault having successive spans is formed; and
means for supporting the continuous vault having the successive spans, whereby the greenhouse is formed.

19. A greenhouse having a curved glazed roof, comprising:
at least one continuous vault, said vault having at least two successive arched glazed spans;
each span having at least two juxtaposed curved glazed panels;
each panel including a thermally-tempered, cold-curved sheet of glass having a resiliently-flexed curvature formed therein, each of said sheets of glass further having a pair of substantially parallel curved edges and a pair of substantially parallel straight edges, said panel further including a curved frame disposed about the edges of the sheet of the curved sheet of glass and adapted to maintain the resiliently-flexed curvature of the sheet of glass under constraint, said curved frame having a pair of substantially parallel curved frame sections including a pair of opposite ends and a pair of substantially parallel straight frame sections including a pair of opposite ends, each of the straight frame sections disposed along a respective straight edge of the sheet of glass and each of the curved frame sections being disposed along a respective curved edge of the sheet of glass, each respective opposite end of the straight frame sections being secured to a respective opposite end of one of the curved frame sections, and said panel further including means for securing each frame section to the edge of the sheet of glass along which the respective frame sections are disposed;
each of the curved glazed panels of each span being secured by one of the straight frame sections thereof to the straight frame section of at least one other curved glazed panel of the same span, whereby the arched glazed spans are formed having the panels in the same span being secured juxtaposed to each other;
at least one of the curved frame sections of the curved glazed panels in one of the spans being joined to one of the curved frame sections of one of the curved glazed panels in another, successive span, whereby the continuous vault is formed; and
means for supporting the continuous vault having successive spans, whereby the greenhouse is formed.

20. The greenhouse of claim 19, further comprising:

the respective curved frame sections of at least a a portion of the curved glazed panels in at least one of the spans being joined to respective curved frame sections of a respective curved glazed panels in another, successive span, whereby the continuous vault is formed.

21. The greenhouse of claim 19, wherein the means for supporting the continuous vault having the successive spans is comprised of:

a plurality of columns, each of said columns being supported on a surface; and each of the spans having a pair of opposite distal panels, at least a portion of the straight frame sections of each distal panel being received on the columns, such that the spans are supported thereon.

22. A greenhouse having a curved glazed roof, comprising:

lateral greenhouse walls;

a curved glazed roof including a continuous vault extending along a longitudinal axis, said vault including a succession of arched glazed spans extending perpendicularly to the axis, said roof being positioned on and supported by the lateral walls;

each span having at least two juxtaposed curved glazed panels;

each panel including a thermally-tempered, cold-curved sheet of glass having a resiliently-flexed curvature formed therein, each of said sheets of glass further having a pair of substantially parallel curved edges and a pair of substantially parallel straight edges, said panel further including a curved frame disposed about the edges of the sheet of the curved sheet of glass and adapted to maintain the resiliently-flexed curvature of the sheet of glass under constraint, said curved frame having a pair of substantially parallel curved frame sections including a pair of opposite ends and a pair of substantially parallel straight frame sections including a pair of opposite ends, each of the straight frame sections disposed along a respective straight edge of the sheet of glass and each of the curved frame sections being disposed along a respective curved edge of the sheet of glass, each respective opposite end of the straight frame sections being secured to a respective opposite end of one of the curved frame sections, and said panel further including means for securing each frame section to the edge of the sheet of glass along which the respective frame sections are disposed;

each of the curved glazed panels of each span being secured by one of the straight frame sections thereof to the straight frame section of at least one other curved glazed panel of the same span, whereby the arched glazed spans are formed having the panels in the same span being secured juxtaposed to each other; and at least one of the curved frame sections of the curved glazed panels in at least one of the spans being joined to one of the curved frame sections of one of the curved glazed panels in another, successive span, whereby the continuous vault is formed.

23. The greenhouse of claim 22, further comprised of:

the lateral greenhouse walls having a top and a bottom which rests on a surface;

the vault further including a framework having a pair of substantially parallel, longitudinal beams positioned about the top of the lateral walls, said longitudinal beams further being positioned substantially parallel to the longitudinal axis; and each of the spans having a pair of opposite distal panels, one of the straight frame sections of each distal panel being received on a respective longitudinal beam, such that the spans are supported thereon.

24. The greenhouse of claim 23, further comprised of:

one of the straight frame sections of one of the distal panels of at least one span being pivotably secured at a pivot point to the one of the longitudinal beams on which it is supported, such that at least a portion of the span may pivot and tilt about the pivot point between a first closed position wherein the roof is closed and a second open position wherein the roof is open.

25. The greenhouse of claim 24, further comprised of:

the straight frame section of the other distal panel of the pivotably secured spans which are supported on the other longitudinal beam being removably secured thereto by a latch means including an outwardly-extending curved latch finger formed on the said straight frame section, said curved finger having a latch seat formed therein and an outwardly-extending rib formed on the said other longitudinal beam, said rib being engaged by and supported in the latch seat when the straight frame section is supported on the said other longitudinal beam, such that the rib is removably secured to the latch seat.

26. The greenhouse of claim 23, wherein the straight frame section of one of the distal panels of at least one span being pivotably secured at a pivot point to the longitudinal beam on which the said straight frame section is supported is comprised of:

the straight frame section of the one of the distal panels which is pivotably secured to the longitudinal beam includes a substantially C-shaped hinge seat formed in the straight frame section; and an outwardly extending hinge rib is formed on the said longitudinal beam, said rib being pivotably received and secured in the hinge seat defining a pivot point about which the span pivots.

27. The greenhouse of claim 23, wherein the framework of the vault is further comprised of:

a plurality of trusses, each truss positioned perpendicularly to the longitudinal axis and extending between and secured to each of the longitudinal beams, each truss including a tie beam having a first end and a second opposite end, each truss further including a curved extrados section having a first end and a second opposite end;

the tie beam and extrados section of each respective truss being disposed on substantially the same vertical plane; and the extrados sections being adapted to receive the curved frame sections of the curved glazed panels thereon, whereby support for the panels is provided.

28. The greenhouse of claim 27, further comprised of:

a peak beam, said peak beam being disposed substantially coincident with the longitudinal axis of the vault, said peak beam being further secured to at least one of the extrados sections; and means for pivotably securing the one of the straight frame sections of at least one of the curved glazed panels of at least one of the spans to the peak beam about a pivot point, such that each of the pivotably secured curved glazed panels, and the panels in the span secured thereto, may be selectively pivoted about the peak beam to which it is secured between a first closed position and a second open position and whereby a movable span or a movable span portion is defined.

29. The greenhouse of claim 28, wherein half of the panels in at least one of the spans are secured to the panel being pivotably secured to the peak beam, such that half of the span pivots about the pivot point.

30. The greenhouse of claim 28, wherein less than half of the panels in at least one of the spans are secured to the panel being pivotably secured to the peak beam, such that less than half of the span pivots about the pivot point.

31. The greenhouse of claim 28, wherein the means for pivotably securing the one of the straight frame sections of at least one of the curved glazed panels of at least one of the spans to the peak beam about a pivot point is comprised of:
 a hinge including an outwardly-extending cylindrical hinge rib said hinge being integral with the peak beam and a substantially C-shaped hinge seat carried by the pivotably secured straight frame section, said hinge rib being pivotably received in said hinge seat for pivotably securing the panel to the peak beam for pivotal movement between the first and second positions.

32. The greenhouse of claim 28, further comprised of:
 each of the pivotably movable spans including a free end positioned opposite of the portion of the span being pivotably secured; and
 a latch means including an outwardly-extending curved latch finger formed on a straight frame section of the panel positioned at the free end of the span, said curved finger having a latch seat formed therein, and an outwardly-extending rib, said rib being engaged by and supported in the latch seat when the pivotably movable span is in the first closed position, such that the rib is removably secured to the latch seat.

33. The greenhouse of claim 29, further comprised of:
 the distal panel of the pivotable portion of each of the spans being received on and supported by one of the longitudinal beams; and
 a latch means including an outwardly-extending curved latch finger formed on a straight frame section of the distal panel, said curved finger having a latch seat formed therein, and the latch means further including an outwardly-extending rib formed on the said one of the longitudinal beams, said rib being engaged by and supported in the latch seat when the pivotably movable span is in the first closed position, such that the rib is removably secured to the latch seat.

34. The greenhouse of claim 23, further comprised of:
 each of said longitudinal beams being substantially hollow, defining a fluid conduit therein and serving as a gutter for the evacuation of fluids.

35. The greenhouse of claim 34, further comprised of:
 a plurality of columns positioned upon and supported by a surface, each of the columns being substantially hollow, defining a fluid conduit therein and serving as a gutter for the evacuation of fluids; and
 means for providing fluid communication between the fluid conduit formed in the columns and the fluid conduit formed in the longitudinal beams, whereby fluid received in the longitudinal beams may be passed to the columns.

36. The greenhouse of claim 34, further comprised of:
 each longitudinal beam having an upper trough formed therein, said upper trough being positioned on substantially the central portion thereof;
 a plurality of notches formed in each longitudinal beam on either side of the upper trough, said notches being formed having a shape being substantially identical to the shape of the frame sections of the curved glazed panels received on the longitudinal beam, such that each of said frame sections is received in a respective notch being seated therein;
 the upper trough having at least one opening formed therein providing for fluid communication between the upper trough and the fluid conduit formed in the longitudinal beam, such that fluid in the trough may pass therefrom into the fluid conduit; and
 each of the notches having at least one opening formed therein providing for fluid communication between the notches and the fluid conduit defined in the longitudinal beam, such that fluid in the notches may pass therefrom into the fluid conduit.

37. The greenhouse of claim 22, further comprised of:
 at least two substantially parallel longitudinal beams oriented substantially parallel to the longitudinal axis;
 a plurality of trusses, each of said trusses including a respective tie beam and a curved extrados section, the curved extrados section and the tie beams of each truss having a pair of opposite ends, each of said extrados sections and tie beams of each truss positioned extending between the parallel longitudinal beams with the opposite ends thereof secured to a respective longitudinal beams, such that the longitudinal beam support the truss therebetween;
 each of the longitudinal beams being substantially hollow, defining a fluid conduit therein and serving as a gutter for the evacuation of fluids;
 each of said longitudinal beams having a substantially centrally positioned upper trough formed therein and a pair of notches, one of said notches being formed in the longitudinal beam on either side of the trough, said notches being adapted to receive a straight frame section of a mobile curved glazed panel therein;
 a jaw positioned under and extending at least partially about the longitudinal beam for removably receiving and supporting the longitudinal beam therein;
 the upper trough having at least one opening formed therein providing for fluid communication between the upper trough and the fluid conduit formed in the longitudinal beam, such that fluid in the trough may pass therefrom into the fluid conduit; and
 each of the notches having at least one opening formed therein providing for fluid communication between the notches and the fluid conduit defined in the longitudinal beam, such that fluid in the notches may pass therefrom into the fluid conduit.

* * * * *